(12) United States Patent
Nishimura

(10) Patent No.: US 10,956,754 B2
(45) Date of Patent: Mar. 23, 2021

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Kazuya Nishimura, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 69 days.

(21) Appl. No.: 16/412,540

(22) Filed: May 15, 2019

(65) Prior Publication Data

US 2020/0034636 A1 Jan. 30, 2020

(30) Foreign Application Priority Data

Jul. 24, 2018 (JP) .............................. JP2018-138836

(51) Int. Cl.
*G06K 9/00* (2006.01)
*G06K 9/62* (2006.01)
*G06T 7/70* (2017.01)

(52) U.S. Cl.
CPC ....... *G06K 9/00791* (2013.01); *G06K 9/6218* (2013.01); *G06T 7/70* (2017.01); *G06T 2207/30252* (2013.01)

(58) Field of Classification Search
CPC ............. G06K 9/00791; G06K 9/6218; G06K 9/6223; G06K 9/6256; G06K 9/00651; G06K 9/00771; G06K 9/3258; G06K 9/00684; G06K 9/4676; G06K 9/6202; G06K 9/00624; G06K 9/00664; G06K 9/00288; G06K 9/00637; G06K 9/6267; G06T 7/70; G06T 7/337; G06T 17/00; G06T 17/05; G06T 19/00; G06T 2207/30252; G06T 2207/20124; G06T 2207/20212; G06T 2207/10032;
(Continued)

(56) References Cited

U.S. PATENT DOCUMENTS 9,208,171 B1 * 12/2015 Cotting ................... G06F 16/58
9,495,614 B1 * 11/2016 Boman ................ G06K 9/6267
(Continued)

FOREIGN PATENT DOCUMENTS

JP 2011-527527 A 10/2011
WO 2009/153557 A1 12/2009

*Primary Examiner* — Jose L Couso
(74) *Attorney, Agent, or Firm* — Oliff PLC

(57) ABSTRACT

An information processing apparatus includes: a first acquisition unit configured to acquire a plurality of photographed images with photographing location information of the plurality of photographed images; an extraction unit configured to extract, from the photographed images, a plurality of object images containing an object preset as an extraction object; a clustering unit configured to cluster the object images into a plurality of clusters; a second acquisition unit configured to acquire, from map information, at least one name of at least one facility present around each photographing location of the object images; and an application unit configured to apply, to the object images belonging to an intended cluster included in the clusters, a label of a specific name of a specific facility satisfying an application condition among the at least one name of the at least one facility acquired by the second acquisition unit for the object images.

7 Claims, 6 Drawing Sheets

(58) Field of Classification Search
CPC .. G06F 16/5866; G06F 16/55; G06F 16/2365; G06F 16/29; G06F 16/21; G06F 16/23; G06F 16/337; G06F 16/51; G06F 16/58; G06F 16/583; G06F 16/487; G06F 16/587; G06F 3/04815; G01C 21/00; G01C 21/20; G01C 21/3638; G01C 21/3647; G01C 21/3673; G01C 21/3476; G01C 21/3614; G01C 21/3679; G01C 21/3644; G06Q 30/0261; H04N 1/00183; H04N 5/225

See application file for complete search history.

(56) References Cited

U.S. PATENT DOCUMENTS

| | | | | |
|---|---|---|---|---|
| 2008/0104011 A1* | 5/2008 | Shibasaki | ................ | G06T 7/33 |
| 2008/0268876 A1* | 10/2008 | Gelfand | ................ | G06F 16/583 |
| | | | | 455/457 |
| 2011/0184953 A1* | 7/2011 | Joshi | ................ | G06K 9/4676 |
| | | | | 707/738 |
| 2014/0250126 A1* | 9/2014 | Baldwin | ................ | G06F 16/51 |
| | | | | 707/737 |
| 2018/0075061 A1* | 3/2018 | Purumala | ............ | G06F 16/5866 |

\* cited by examiner

INFORMATION PROCESSING APPARATUS AND INFORMATION PROCESSING METHOD

INCORPORATION BY REFERENCE

The disclosure of Japanese Patent Application No. 2018-138836 filed on Jul. 24, 2018 including the specification, drawings and abstract is incorporated herein by reference in its entirety.

BACKGROUND

1. Technical Field

The present disclosure relates to an information processing apparatus and an information processing method.

2. Description of Related Art

There is known a technique for image recognition of a prescribed object in an image. In the technique, object recognition accuracy is enhanced by using images of a plurality of objects to which labels indicative of the respective objects are applied, as learning data for machine learning. In order to create the learning data, known object images need to be labelled.

As the technique of providing information to an image, Published Japanese Translation of PCT application No. 2011-527527 discloses a technique that provides an identification device on an item to be tagged and detects the position of the identification device in each frame of a moving image obtained by photographing the item so as to identify the position of the tagged item in each frame.

SUMMARY

Generally, in order to create learning data, a user extracts a plurality of object images from a moving image, and performs an annotation process of the extracted object images. In the annotation process, the user inputs labels indicative of the objects, and applies the labels to the object images. A higher recognition accuracy is achieved as the number of object images for the learning data becomes larger. However, it takes a long time to create large-scale learning data.

The present disclosure provides an information processing apparatus and an information processing method which can reduce the time required for creating the learning data.

A first aspect of the disclosure provides an information processing apparatus. The information processing apparatus includes: a first acquisition unit configured to acquire a plurality of photographed images together with photographing location information of the plurality of photographed images; an extraction unit configured to extract, from the photographed images, a plurality of object images containing an object preset as an extraction object; a clustering unit configured to cluster the object images into a plurality of clusters; a second acquisition unit configured to acquire, from map information, at least one name of at least one facility present around each photographing location of the object images; and an application unit configured to apply, to the object images belonging to an intended cluster included in the clusters, a label of a specific name of a specific facility, the specific name of the specific facility satisfying an application condition among the at least one name of the at least one facility acquired by the second acquisition unit for the object images.

According to the aspect, the time required for label application can be shortened.

In the first aspect, the application unit may be configured not to apply the label to the object images not provided with the specific name of the specific facility, the specific name of the specific facility being acquired by the second acquisition unit, in the intended cluster included in the clusters.

In the first aspect, the second acquisition unit may be configured to acquire, as the at least one name of the at least one facility, at least one name of at least one facility present in a predetermined distance from the photographing locations of the object images.

In the first aspect, the clustering unit may be configured to re-cluster the object images belonging to the intended cluster, when all of the at least one name of the at least one facility do not satisfy the application condition, in the intended cluster.

In the first aspect, the application condition may include a condition that a ratio of the number of the at least one name of the at least one facility in the intended cluster, the at least one name of the at least one facility being acquired by the second acquisition unit, to the number of the object images belonging to the intended cluster, is equal to or more than a predetermined reference value.

A second aspect of the disclosure provides an information processing method. The information processing method includes: acquiring a plurality of photographed images together with photographing location information of the plurality of photographed images; extracting, from the photographed images, a plurality of object images containing an object preset as an extraction object; clustering the object images into a plurality of clusters; acquiring, from map information, at least one name of at least one facility present around each photographing location of the object images; and applying, to the object images belonging to an intended cluster included in the clusters, a label of a specific name of a specific facility, the specific name of the specific facility satisfying an application condition among the at least one name of the at least one facility acquired for the object images.

According to the aforementioned aspect, the time required for creating the learning data can be shortened.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
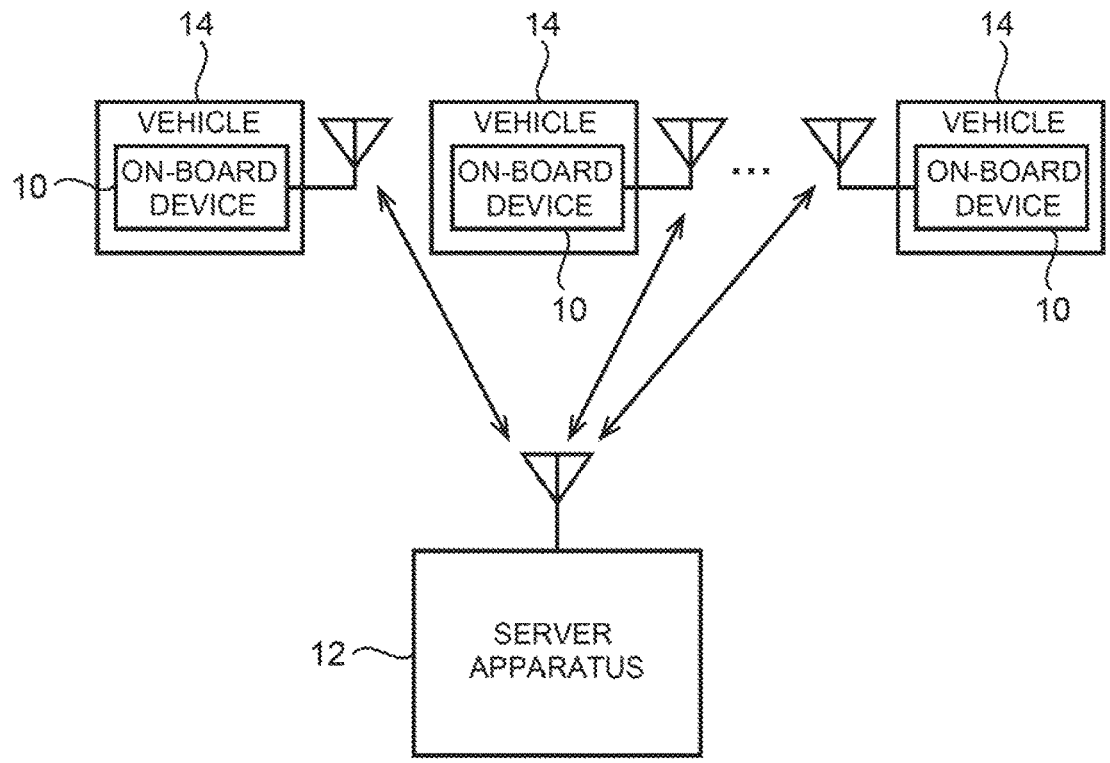
FIG. 1 is a block diagram showing the configuration of a vehicle system according to a first embodiment.

FIG. 1 is a block diagram showing the configuration of a vehicle system 1 according to a first embodiment. The vehicle system 1 includes a plurality of on-board devices 10 and a server apparatus 12. In FIG. 1, among the on-board devices 10, three on-board devices 10 are illustrated.

The on-board devices 10 are mounted on vehicles 14. The on-board devices 10 perform wireless communication with the server apparatus 12. The on-board devices 10 may perform wireless communication with the server apparatus 12 through a base station not illustrated.

Each of the on-board devices 10 sequentially transmits photographed images photographed by an in-vehicle camera to the server apparatus 12. The photographed images are outside images, such as images in front of an own vehicle.

The server apparatus 12, which is disposed, for example, in a data center, functions as an information processing apparatus that processes a plurality of photographed images transmitted from the on-board devices 10 of the vehicles 14. As described later, the server apparatus 12 extracts images of an object set as an extraction object from the photographed images, applies labels to labeling target images among the extracted object images, and creates learning data including a plurality of object images to which labels are applied. The objects, which relate to facilities, include signboards of facilities, and buildings of facilities. The facilities are included in map information. The facilities include stores. The labels include a facility name. Hereinafter, the signboard of a store is assumed as an object, and the label is assumed to include a store name.

The server apparatus 12 performs machine learning by using created learning data in order to optimize an image recognition logic for recognizing the image of an object so as to enhance recognition accuracy of the object. For example, the signboard of a certain store name is learned by using object images photographed by a plurality of vehicles under various weathers in various photographing locations at various photographing time. Accordingly, the recognition accuracy of the signboard of the certain store name can be enhanced even when the brightness or color of the object images are different depending on the weathers or time periods. The image recognition logic can be constructed with well-known technologies, such as a neural network. The image recognition logic that is learned and optimized is supplied to the on-board devices 10 through wireless communication, cable communication, recording media, or the like.

The on-board device 10 recognizes the image of an object from a photographed image photographed with a camera by using the supplied image recognition logic. The result of image recognition of the object can be used for various application purposes. For example, when the image of the signboard of a store name "Bookstore AA" is recognized, a navigation system may provide a route guidance such as "turn right at next intersection with the signboard of 'Bookstore AA.'" In this example, it is possible to perform more user-friendly route guidance.

Figure 2:
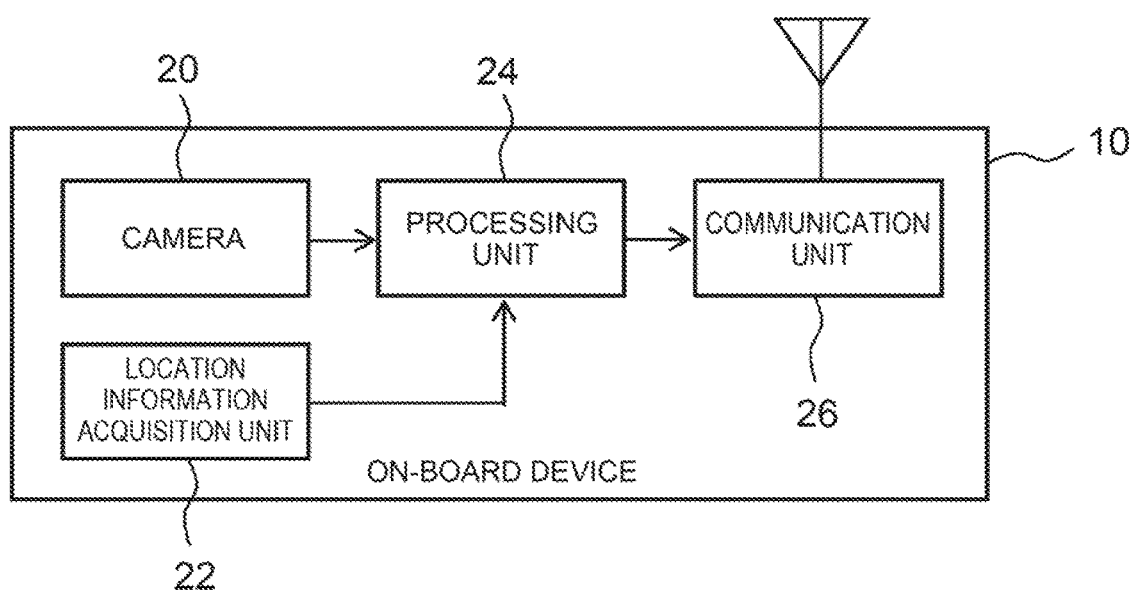
FIG. 2 is a block diagram of an on-board device of FIG. 1.

FIG. 2 is a block diagram of the on-board device 10 of FIG. 1. The on-board device 10 includes a camera 20, a location information acquisition unit 22, a processing unit 24, and a communication unit 26.

The camera 20 is disposed in an own vehicle to continuously photograph outside images. A plurality of photographed images constitute a dynamic image. That is, the photographed images are static images which can also be called frames. Photographing time is attached to the photographed images. The camera 20 sequentially outputs the photographed images to the processing unit 24.

The location information acquisition unit 22 periodically acquires information on the location of the own vehicle, and outputs the location information to the processing unit 24. The location information is acquired from an unshown GPS receiver, for example. The time of acquisition is attached to the location information.

The processing unit 24 derives photographing locations of photographed images based on the photographed images output from the camera 20 and on the location information output from the location information acquisition unit 22, and attaches the information on the derived photographing locations to the corresponding photographed images. For example, the processing unit 24 derives the location information, acquired at the time closest to the photographing time of a photographed image, as the photographing location of the photographed image.

When the learned image recognition logic is already acquired in the on-board device 10, the processing unit 24 recognizes the image of an object in a photographed image. When recognizing that the object is present in the photographed image through image recognition, the processing unit 24 attaches known object information indicating that the region of the object is the region of a known object. The processing unit 24 outputs to the communication unit 26 the photographed image with at least photographing location information attached thereto.

The communication unit 26 performs wireless communication with the server apparatus 12. The communication unit 26 periodically transmits the photographed images output from the processing unit 24 to the server apparatus 12. The frequency to transmit the photographed images can suitably be determined by experiments or the like.

Figure 3:
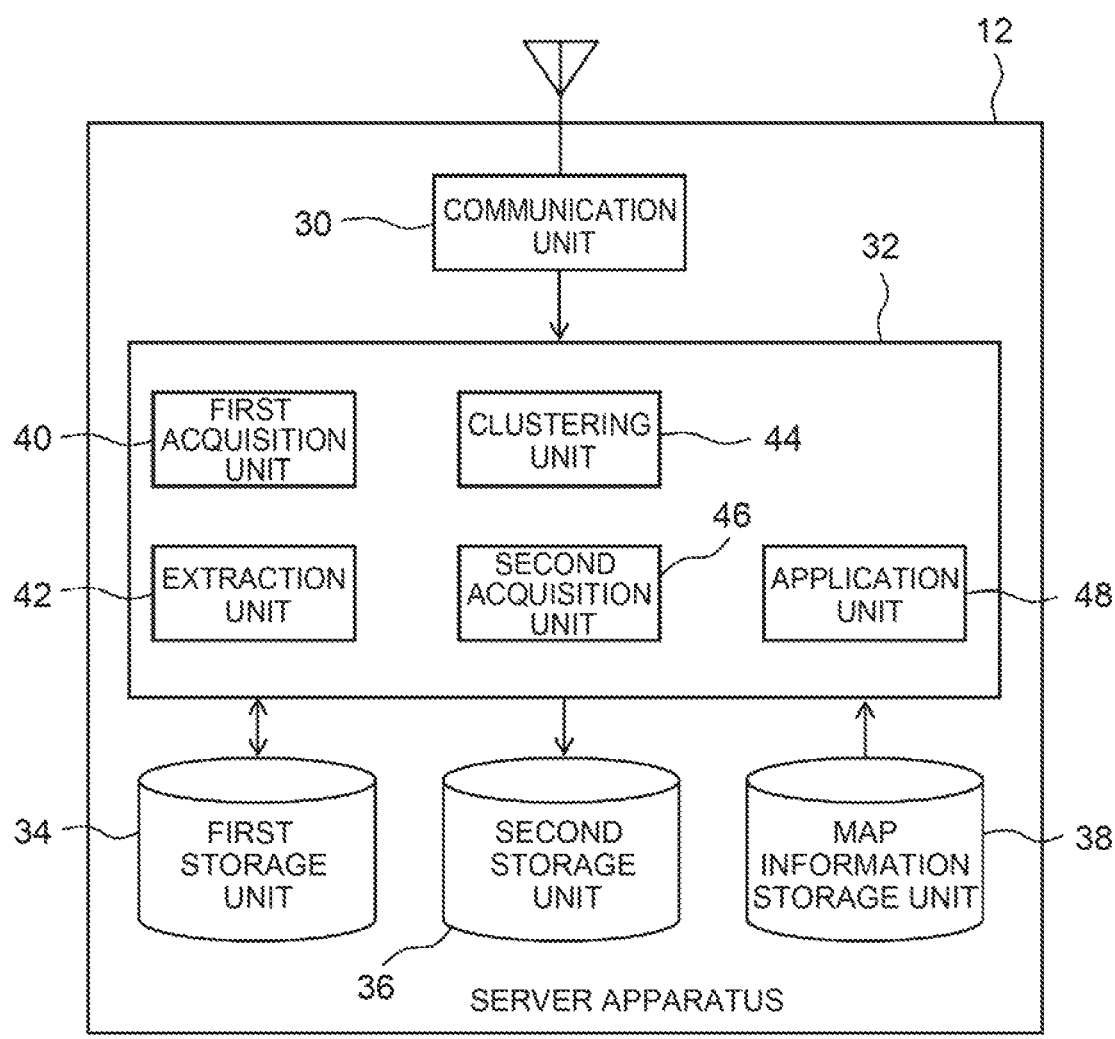
FIG. 3 is a block diagram of a server apparatus of FIG. 1.

FIG. 3 is a block diagram of the server apparatus 12 of FIG. 1. The server apparatus 12 includes a communication unit 30, a processing unit 32, a first storage unit 34, a second storage unit 36, and a map information storage unit 38. The processing unit 32 has a first acquisition unit 40, an extraction unit 42, a clustering unit 44, a second acquisition unit 46, and an application unit 48.

The configuration of the processing unit 32 can be implemented by a CPU, a memory, or other LSIs of any computer in terms of hardware, and be implemented by programs loaded to the memory, or the like, in terms of software. Depicted in FIG. 3 are functional blocks implemented by cooperation of the hardware and software. Therefore, it is understood by those skilled in the art that these functional blocks can be implemented in various forms such as only by hardware, only by software, or the combination of hardware and software.

The communication unit 30 receives a plurality of photographed images from the on-board device 10 of each vehicle 14. The communication unit 30 outputs the photographed images to the first acquisition unit 40. The first acquisition unit 40 acquires the photographed images output from the communication unit 30 together with the photographing location information. The first acquisition unit 40 also acquires known object information, when the known object information is attached to the photographed images.

The extraction unit 42 extracts from the photographed images acquired by the first acquisition unit 40 the images of an object set as an extraction object, and stores the extracted object images in the first storage unit 34. The original photographing time of the photographed images is also attached to the object images.

Specifically, the extraction unit 42 applies a label to each photographed image per pixel, and divides each photographed image into a plurality of regions that are set as dividing targets. This process can also be called segmentation of each photographed image. Each photographed image is divided into regions such as the region of an object, the region of sky, the region of roads, the region of vehicles, and region of human beings for example. The region of an object can be identified, for example, as the region of signboards. However, it is not identified which signboard the region represents, and various signboards are identified as the region of signboards. The function of the extraction unit 42 may be implemented by using well-known technologies, such as SegNet.

When the region of an object is present in each of the photographed images, the extraction unit 42 extracts the region of the object as an object image unless the region of the object is the region of a known object. By extracting the region of the object, the amount of data can be reduced.

When the region of an object is not present in each of the photographed images, or the region of an object is the region of a known object region, the extraction unit 42 does not extract the object image. For example, when a signboard image is present but the image of the signboard is already recognizable as the signboard of the store of a certain store name, the extraction unit 42 does not extract the object image. Since the already recognizable image of the object can be excluded, processing load can be reduced.

When the known object information is attached to a photographed image, the extraction unit 42 determines that the region of an object indicated by the known object information is the region of a known object. Alternatively, when recognizing a photographed image with the learned image recognition logic, and thereby recognizing that the region of an object is present, the extraction unit 42 may determine that the region of an object is the region of a known object.

The clustering unit 44 clusters the object images stored in the first storage unit 34 based on feature values of the images, whenever a start condition is satisfied. The start condition is the lapse of a prescribed period after the previous clustering. When first-time clustering is not yet implemented, the start condition is the lapse of a prescribed period after the start of acquisition of the photographed image. The start condition may also be that a prescribed amount of object images is stored in the first storage unit 34.

Clustering can be performed with a well-known technology such as k-means. Object images similar in feature value belong to each of the obtained clusters. Hence, object images in one cluster are similar to each other.

The second acquisition unit 46 acquires, from map information stored in the map information storage unit 38, the names of facilities around the photographing locations of the respective object images stored in the first storage unit 34. The second acquisition unit 46 acquires the name of one or more facilities within a prescribed distance from the photographing location of each object image. Hence, even when a facility unrelated to a signboard is present in the vicinity of the signboard, the store name represented by the signboard is also acquired, so that the probability of being able to apply a label to the object image can be enhanced. The prescribed distance may suitably be determined by experiments or the like.

Whenever clustering is performed, the application unit 48 applies, for each cluster, the label of one facility name that satisfies an application condition, among the facility names acquired by the second acquisition unit 46 for target images belonging to a pertinent cluster, to object images belonging to the pertinent cluster. The application condition is that a ratio of the number of facility names acquired by the second acquisition unit 46 to the total number of the object images belonging to the cluster is equal to or more than a reference value. The reference value can suitably be determined by experiments or the like. When the reference value is set to 50% or more, the facility name largest in number within the cluster can be applied to the object images.

For each of the clusters, the application unit 48 does not apply a label to the object images not provided with a facility name that satisfies the application condition, the facility name being acquired by the second acquisition unit 46.

The application unit 48 stores in the second storage unit 36 the object images to which labels are applied. The object images stored in the second storage unit 36 constitute the aforementioned learning data. The application unit 48 deletes from the first storage unit 34 the object images to which labels are applied. Since the object images to which labels are not applied remain in the first storage unit 34, labels may possibly be applied to them in the next clustering.

Figure 4:
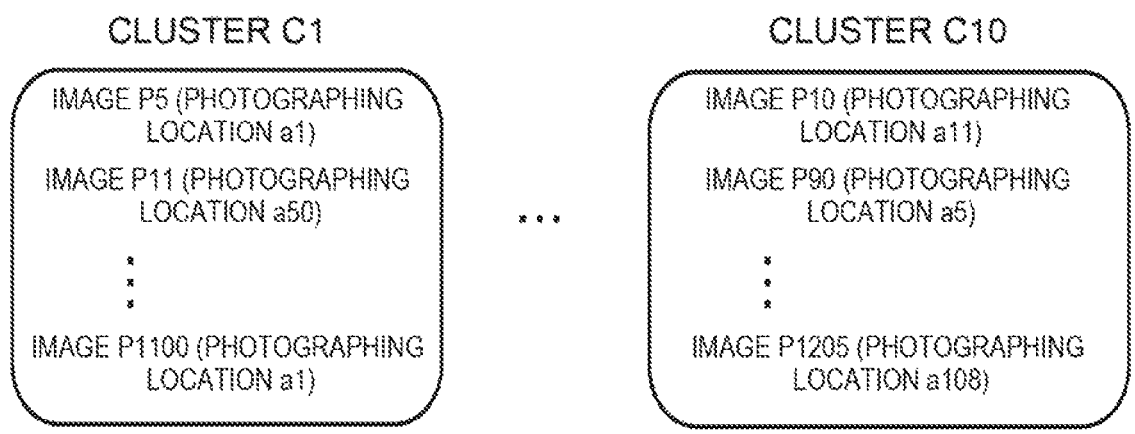
FIG. 4 shows examples of a plurality of images clustered by a clustering unit of FIG. 3.

FIG. 4 shows examples of a plurality of images clustered by the clustering unit 44 of FIG. 3. Object images, such as images P5, P11, P1100, belong to a cluster C1. Object images, such as images P10, P90, P1205, belong to a cluster C10. Illustration of other clusters is omitted.

Figure 5:
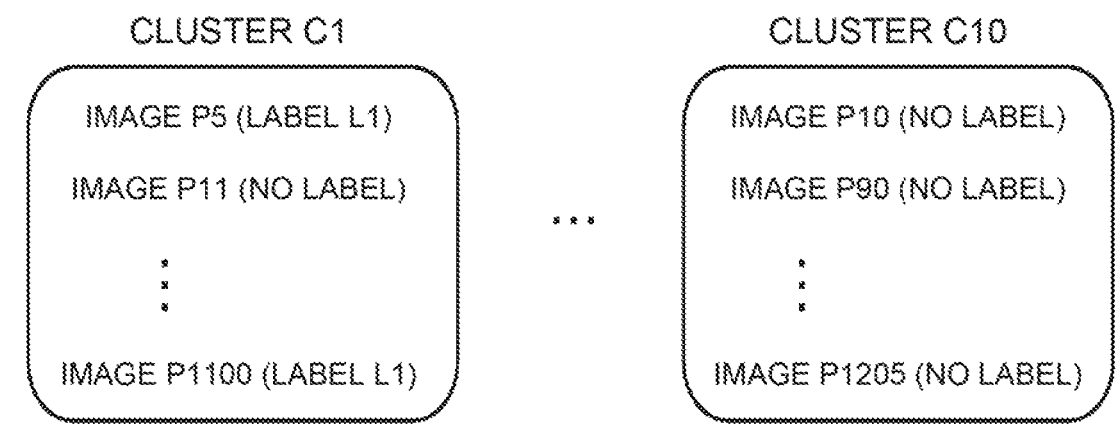
FIG. 5 shows examples of the state where labels are applied to some of the images of FIG. 4.

FIG. 5 shows examples of the state where labels are applied to some of the images of FIG. 4. For example, it is assumed that the names "Bookstore AA" and "Convenience store XXX" of the facilities around a photographing location a1 are acquired for the images P5, P1100 of the cluster C1. It is assumed that the name "Stationer BB" of the facility around a photographing location a50 is acquired for the image P11. Assume the case where, among the facility names acquired by the second acquisition unit 46 in the cluster C1, the facility name "Bookstore AA" is determined to satisfy the application condition. In this case, a label L1 including the facility name "Bookstore AA" is applied to the images, such as the images P5, P1100, for which the facility name "Bookstore AA" is acquired as shown in FIG. 5. The label L1 is not applied to the images such as the image P11 for which the facility name "Bookstore AA" that is the facility name that satisfy the application condition is not acquired. That is, when the facility name "Stationer BB" is not determined to satisfy the application condition, label application to the image P11 is not necessary.

It is also assumed, for example, that the name "Bookstore C" of a facility around a photographing location a11 is acquired for the image P10 of the cluster C10, the names "YY restaurant" and "Drugstore D" of the facilities around a photographing location a5 are acquired for the image P90, and the name "Cafe Z" of a facility around a photographing location a108 is acquired for the image P1205. When no facility name that satisfies the application condition is present in the cluster C10, no label is applied to the images in the cluster C10. In this case, there is a possibility that clustering of the cluster C10 is not appropriate.

When the start condition is satisfied again after the previous clustering, the clustering unit 44 clusters the object images stored in the first storage unit 34. In this case, the first storage unit 34 stores the object images to which labels were not applied in the previous clustering, and object images newly extracted by the extraction unit 42 after the previous clustering. That is, when all the facility names acquired for the object images belonging to a certain cluster do not satisfy the application condition, the clustering unit 44 re-clusters the object images belonging to the cluster. Thus, when all the object images of the certain cluster are not labelled, appropriate re-clustering of the object images may be performed, which may increase the number of the object images to which labels are applied.

The clustering unit 44 may cluster object images by excluding the object images which are photographed a fixed time or more before the current time. The fixed time may suitably be determined by experiments or the like. For example, the fixed time may be determined such that the object image may be re-clustered a plurality of times. This makes it possible to exclude the object images to which labels are not applied for a fixed time or more, and to thereby reduce processing load. The extraction unit 42 may delete from the first storage unit 34 the object images which are photographed a fixed time or more before the current time.

Figure 6:
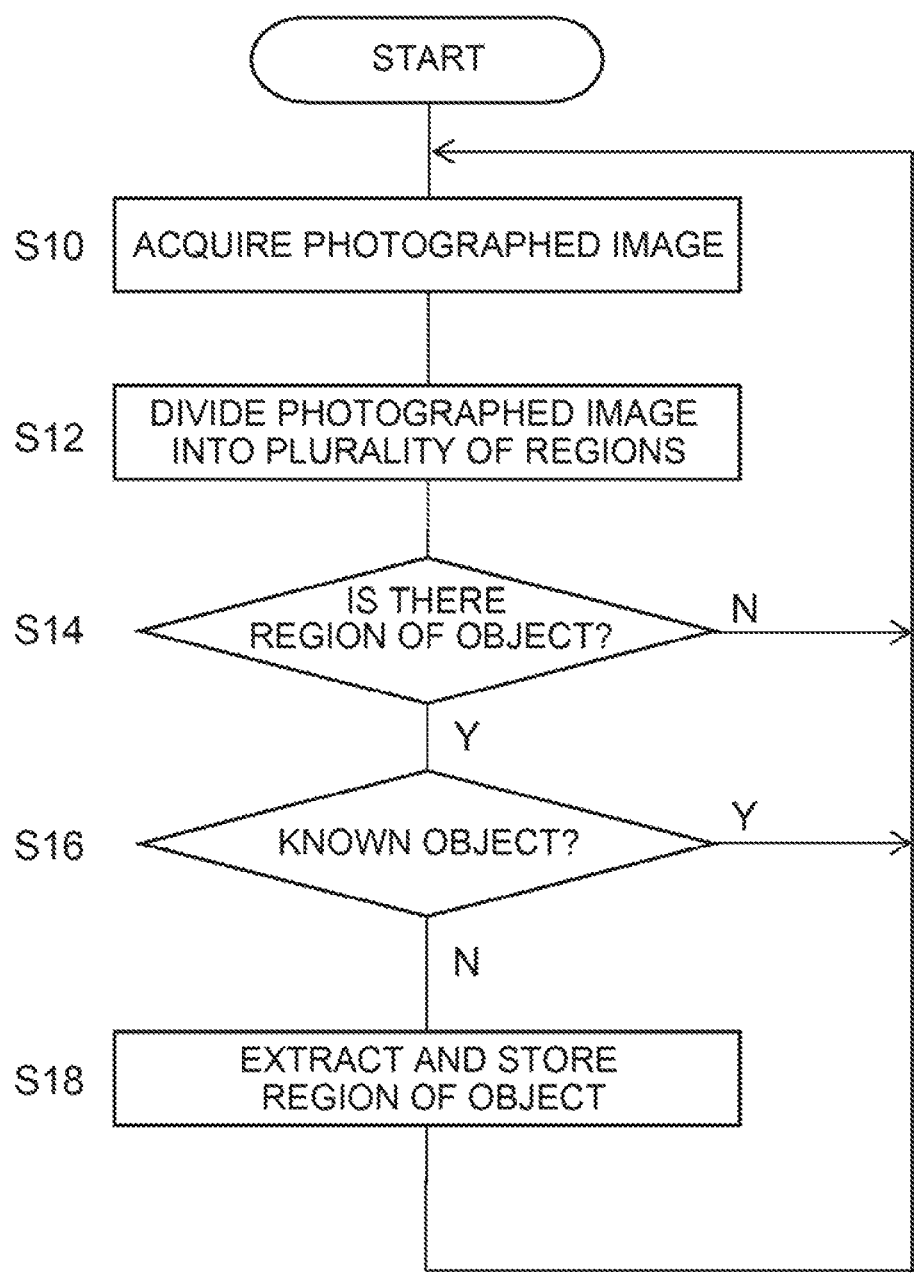
FIG. 6 is a flowchart showing an image extraction process in the server apparatus of FIG. 3.

Description is now given of the overall operation of the server apparatus 12 having the above configuration. FIG. 6 is a flowchart showing an image extraction process in the server apparatus 12 of FIG. 3. The extraction unit 42 acquires one photographed image from the first acquisition unit 40 (S10), and divides the photographed image into a plurality of regions (S12). When there is the region of an object (Y in S14), and the object is not a known object (N in S16), the extraction unit 42 extracts the region of the object, stores the region of the object in the first storage unit 34 (S18), and returns to step 10. When there is no region of an object (N in S14), the extraction unit 42 returns to step 10. When the object is a known object (Y in S16), the extraction unit 42 returns to step 10.

Figure 7:
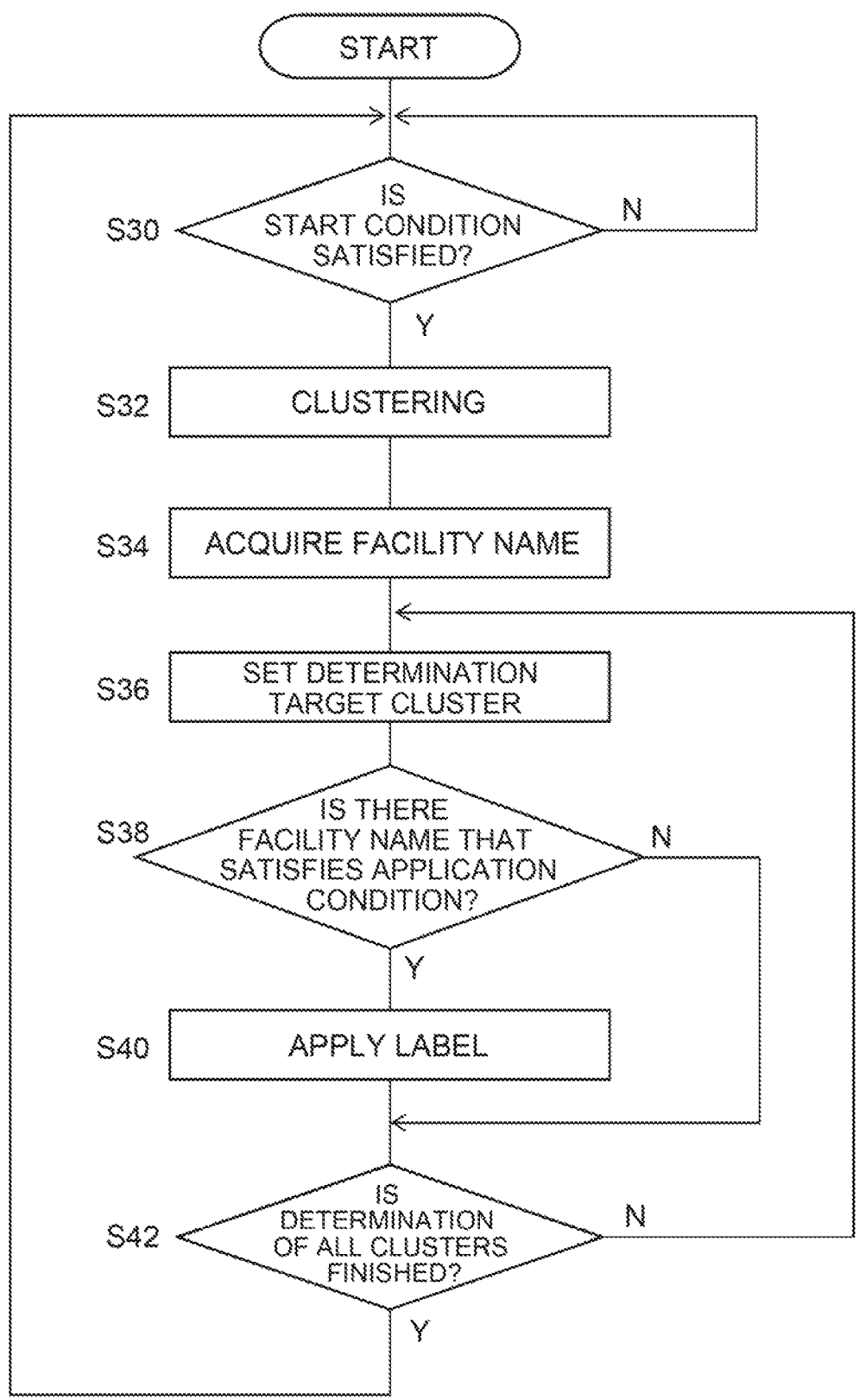
FIG. 7 is a flowchart showing a labeling process in the server apparatus of FIG. 3.

FIG. 7 is a flowchart showing a labeling process (annotation process) in the server apparatus 12 of FIG. 3. The process of FIG. 7 is performed in parallel to the process of FIG. 6. When a start condition is not satisfied (N in S30), the process returns to step 30. When the start condition is satisfied (Y in S30), the clustering unit 44 clusters object images (S32), and the second acquisition unit 46 acquires the names of the facilities around each photographing location of the object images (S34). The processing order of steps 32, 34 may be reversed.

The application unit 48 sets determination target clusters (S36). When there is any facility name that satisfies an application condition regarding the set clusters (Y in S38), the application unit 48 applies a label to the object images (S40). When determination in all the clusters is finished (Y in S42), the process returns to step 30. When determination in all the clusters is not finished in step 42 (N in S42), the process returns to step 36. When there is no facility name that satisfies the application condition in step 38 (N in S38), the process shifts to step 42.

According to the present embodiment, object images are extracted from photographed images and divided into clusters. A label is applied to the object images in each of the clusters based on the names of the facilities around the photographing locations of the object images. Hence, the time required for label application can be shortened. Therefore, the time required for creating the learning data can be shortened. Since it is not necessary for a user to perform label application, it is easy to create large-scale learning data.

Since a label is not applied to the object images not provided with the facility names that satisfy the application condition in each of the clusters, the label application accuracy can be increased.

Second Embodiment

A second embodiment is different from the first embodiment in that labels are applied to the object images with use of the images of known objects the names of which are known. Hereinafter, description is mainly given of the point of difference between the present embodiment and the first embodiment.

The on-board device 10 has the configuration same as the configuration of FIG. 2 except that the on-board device 10 does not include the location information acquisition unit 22 of FIG. 2. The second embodiment is different from the first embodiment in that the processing unit 24 does not use the information on the photographing locations of the photographed images and therefore does not perform the process of deriving the photographing locations of the photographed images and attaching the locations to the photographed images.

The server apparatus 12 has the configuration same as the configuration of FIG. 3 except that the server apparatus 12 does not include the map information storage unit 38 of FIG. 3. The functions of the second acquisition unit 46, the clustering unit 44, and the application unit 48 are different from the first embodiment.

The second acquisition unit 46 acquires an image of a known object the name of which is known, together with the name. The second acquisition unit 46 searches for the image of the known object, to which label application is desired, from Web images through the Internet in response to operation performed by an operator of the server apparatus 12, and acquires the image. The operator may search for the image of the known object with a hash tag. The number of the images of the known object is one or more. As the number is larger, the label application accuracy is enhanced more. For example, in the case where it is desired to provide the label of the facility name "Bookstore AA", one or more images of the signboard of "Bookstore AA" can be searched for and acquired in search engine sites or the like.

The clustering unit 44 clusters the object images stored in the first storage unit 34 and the known object images acquired by the second acquisition unit 46 based on feature values of the images, whenever the start condition is satisfied. For example, when the signboard image of "Bookstore AA" and a plurality of unknown signboard images are clustered, the signboard image and signboard images similar to the signboard image belong to the same cluster. The signboard images in this cluster are highly likely to be the signboard image of "Bookstore AA."

The application unit 48 applies the label of the known object image to object images belonging to the cluster same as the cluster of the known object image.

Figure 8:
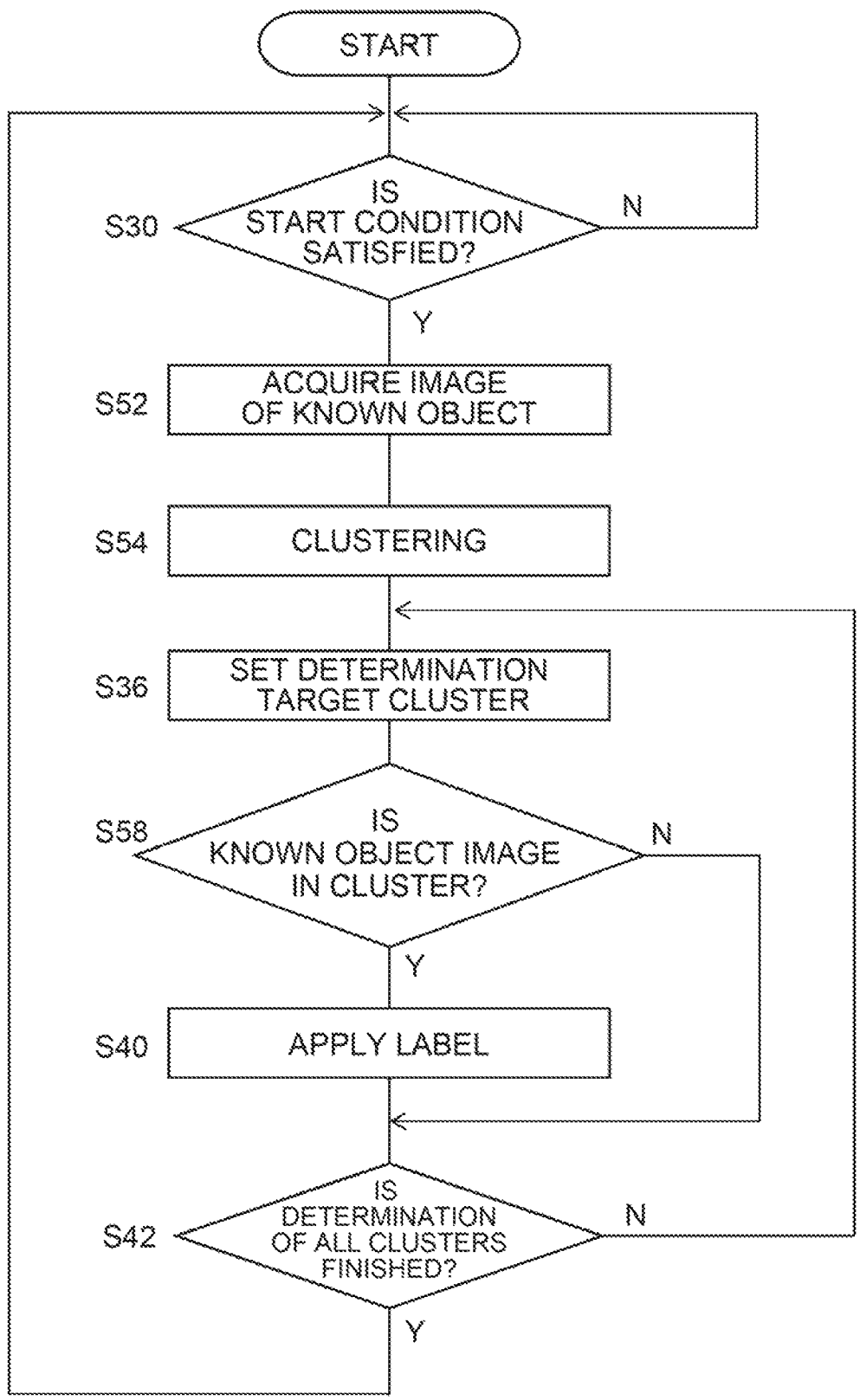
FIG. 8 is a flowchart showing the labeling process in the server apparatus of a second embodiment.

FIG. 8 is a flowchart showing the labeling process in the server apparatus 12 of the second embodiment. The steps identical to the steps of FIG. 7 are designated by identical reference signs to suitably omit the description thereof. When the start condition is satisfied (Y in S30), the second acquisition unit 46 acquires images of known objects (S52), and the clustering unit 44 clusters the images of the known objects and object images (S54).

The application unit 48 sets a determination target cluster (S36). When any known object image is in the set cluster (Y in S58), the label of the known object image is applied to the object images in the cluster (S40). When there is no known object image in the set cluster (N in S58), the process shifts to step 42.

According to the embodiment, the time required for creating the learning data can be shortened. Since the photographing location information is not used, the data amount of the object images can be made smaller than the first embodiment.

The present disclosure has been described based on the embodiments. Since the embodiments are merely illustrative, it is understood by those skilled in the art that various modifications for the combination of the respective component members and the processing processes are possible and that such modifications are within the range of the present disclosure.

The first embodiment has been described based on an example in which the application unit 48 does not apply a label to the object images not provided with the facility names that satisfy the application condition. However, the application unit 48 may apply the label of the facility name that satisfies the application condition to all the object images belonging to the pertinent cluster. In this modification, the process can be simplified.

In the first embodiment, the camera 20 of the on-board device 10 may photograph an image and also measure the distance to an object. The processing unit 24 may derive the location of the object based on the measured distance and the location of an own vehicle, and may attach the information on the location of the object to the photographed image. The second acquisition unit 46 of the server apparatus 12 may acquire the name of one or more facilities in a prescribed distance from the location of the object. In this modification, when the images of a plurality of objects different in location are acquired from the photographed images at one photographing location, there is a possibility that more appropriate facility name may be acquired for each object image.

What is claimed is:

1. An information processing apparatus comprising:
a processor and/or circuit configured to:
   acquire a plurality of photographed images together with photographing location information of the plurality of photographed images;
   extract, from the photographed images, a plurality of object images containing an object preset as an extraction object;
   cluster the object images into a plurality of clusters;
   acquire, from map information, at least one name of at least one facility present around each photographing location of the object images; and
   apply, to the object images belonging to an intended cluster included in the plurality of clusters, a label of a specific name of a specific facility, the specific name of the specific facility satisfying an application condition among the acquired at least one name of the at least one facility for the object images, wherein:
in a case when all of the at least one name of the at least one facility do not satisfy the application condition, the object images belonging to the intended cluster are re-clustered in the intended cluster.

2. The information processing apparatus according to claim 1, wherein
the processor and/or the circuit is further configured to:
   not to apply the label to the object images not provided with the specific name of the specific facility in the intended cluster included in the clusters.

3. The information processing apparatus according to claim 1, wherein
the processor and/or the circuit is further configured to:
   acquire, as the at least one name of the at least one facility, at least one name of at least one facility present in a predetermined distance from the photographing locations of the object images.

4. The information processing apparatus according to claim 1, wherein
the application condition includes a condition that a ratio of the number of the at least one name of the at least one facility in the intended cluster to the number of the object images belonging to the intended cluster, is equal to or more than a predetermined reference value.

5. An information processing method comprising:
acquiring a plurality of photographed images together with photographing location information of the plurality of photographed images;
extracting, from the photographed images, a plurality of object images containing an object preset as an extraction object;
clustering the object images into a plurality of clusters;
acquiring, from map information, at least one name of at least one facility present around each photographing location of the object images; and
applying, to the object images belonging to an intended cluster included in the plurality of clusters, a label of a specific name of a specific facility, the specific name of the specific facility satisfying an application condition among the at least one name of the at least one facility acquired for the object images, wherein:
in a case when all of the at least one name of the at least one facility do not satisfy the application condition, the object images belonging to the intended cluster are re-clustered.

6. An information processing apparatus comprising:
a processor and/or circuit configured to:
   acquire a plurality of photographed images together with photographing location information of the plurality of photographed images;
   extract, from the photographed images, a plurality of object images containing an object preset as an extraction object;
   cluster the object images into a plurality of clusters;
   acquire, from map information, at least one name of at least one facility present around each photographing location of the object images; and
   apply, to the object images belonging to an intended cluster included in the clusters, a label of a specific name of a specific facility, the specific name of the specific facility satisfying an application condition among the acquired at least one name of the at least one facility for the object images, wherein:
the application condition includes a condition that a ratio of the number of the at least one name of the at least one facility in the intended cluster to the number of the object images belonging to the intended cluster, is equal to or more than a predetermined reference value.

7. An information processing apparatus comprising:
a processor and/or circuit configured to:
   acquire a plurality of photographed images together with photographing location information of the plurality of photographed images;
   extract, from the photographed images, a plurality of object images containing an object preset as an extraction object;
   cluster the object images into a plurality of clusters;
   acquire at least one name for a plurality of facilities present within a surrounding area around each photographing location of the object images;
   apply, to the object images belonging to an intended cluster included in the clusters, a label of a specific name of a specific facility, the specific name of the specific facility satisfying an application condition among the acquired at least one name for the plurality of facilities present within a surrounding area around each photographing location of the object images.

* * * * *